United States Patent
Konik et al.

(10) Patent No.: US 8,601,474 B2
(45) Date of Patent: Dec. 3, 2013

(54) RESUMING EXECUTION OF AN EXECUTION PLAN IN A VIRTUAL MACHINE

(75) Inventors: Rafal P. Konik, Oronoco, MN (US);
Roger A. Mittelstadt, Byron, MN (US);
Brian R. Muras, Rochester, MN (US);
Mark W. Theuer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 228 days.

(21) Appl. No.: 13/273,779

(22) Filed: Oct. 14, 2011

(65) Prior Publication Data

US 2013/0097599 A1  Apr. 18, 2013

(51) Int. Cl.
*G06F 9/455* (2006.01)

(52) U.S. Cl.
USPC .............................................. 718/1; 707/718

(58) Field of Classification Search
None
See application file for complete search history.

(56) References Cited

U.S. PATENT DOCUMENTS

| | | | |
|---|---|---|---|
| 7,603,670 B1 | 10/2009 | van Rietschote | |
| 7,693,982 B2 | 4/2010 | Goldszmidt et al. | |
| 2006/0036617 A1* | 2/2006 | Bastawala et al. | 707/100 |
| 2009/0150463 A1 | 6/2009 | Sekiguchi et al. | |
| 2011/0066819 A1 | 3/2011 | Mashtizadeh et al. | |
| 2012/0254154 A1* | 10/2012 | Rugg et al. | 707/718 |

OTHER PUBLICATIONS

Stuart Devenish et al, "IBM PowerVM Virtualization Introduction and Configuration," ibm.com/redbooks, Nov. 2010, pp. 1-30 and 215-380.

Robert J. Bestgen et al, "Execution Plans with Different Driver Sources in Multiple Threads," U.S. Appl. No. 12/974,538, filed Dec. 21, 2010, pp. 1-36, drawing sheets 1-6.

Anonymous, "Application and Configuration Viewer for a Hibernated Virtual Server," http://priorartdatabase.com/IPCOM/000195826, May 18, 2010, pp. 1-4.

* cited by examiner

*Primary Examiner* — Emerson Puente
*Assistant Examiner* — Dong Kim
(74) *Attorney, Agent, or Firm* — Owen J. Gamon

(57) ABSTRACT

In an embodiment, a query implemented by a first execution plan is executed at a first virtual machine. In response to a move command that requests a move of the first virtual machine from a first computer to a second computer while the first virtual machine is executing the query implemented by the first execution plan at the first computer, an attribute of a resource used by the executing at the first virtual machine is saved to memory at the first computer and a driver source used by the executing at the first virtual machine is saved to the memory at the first computer. In response to a command that requests starting a second virtual machine at the second computer, a determination is made whether the driver source that comprises the state of the partial execution of the first execution plan exists in memory of the second computer.

15 Claims, 10 Drawing Sheets

RESUMING EXECUTION OF AN EXECUTION PLAN IN A VIRTUAL MACHINE

FIELD

An embodiment of the invention generally relates to database management systems that process queries with execution plans and more particularly to virtual machines that resume execution of an execution plan after a shutdown.

BACKGROUND

Computer systems typically comprise a combination of computer programs and hardware, such as semiconductors, transistors, chips, circuit boards, storage devices, and processors. The computer programs are stored in the storage devices and are executed by the processors. Fundamentally, computer systems are used for the storage, manipulation, and analysis of data.

One mechanism for managing data is called a database management system (DBMS) or simply a database. Many different types of databases are known, but the most common is usually called a relational database, which organizes data in tables that have rows, which represent individual entries, tuples, or records in the database, and columns, fields, or attributes, which define what is stored in each entry, tuple, or record. Each table has a unique name within the database and each column has a unique name within the particular table. The database also has one or more indexes, which are data structures that inform the DBMS of the location of a certain row in a table given an indexed column value, analogous to a book index informing the reader of the page on which a given word appears.

The most common way to retrieve data from a database is through statements called database queries, which may originate from user interfaces, application programs, or remote computer systems, such as clients or peers. A query is an expression evaluated by the DBMS, in order to retrieve data from the database that satisfies or meets the criteria or conditions specified in the query. Although the query requires the return of a particular data set in response, the method of query execution is typically not specified by the query. Thus, after the DBMS receives a query, the DBMS interprets the query and determines what internal steps are necessary to satisfy the query. These internal steps may comprise an identification of the table or tables specified in the query, the row or rows selected in the query, and other information such as whether to use an existing index, whether to build a temporary index, whether to use a temporary file to execute a sort, and/or the order in which the tables are to be joined together to satisfy the query. When taken together, these internal steps are referred to as an execution plan. The DBMS often saves the execution plan and reuses it when the user or requesting program repeats the query, which is a common occurrence, instead of undergoing the time-consuming process of recreating the execution plan.

Many different execution plans may be created for any one query, each of which would return the same data set that satisfies the query, yet the different execution plans may provide widely different performance. Thus, the execution plan selected by the DBMS needs to provide the required data at a reasonable cost in terms of time and hardware resources. Hence, the DBMS often creates multiple prospective execution plans and then chooses the best, fastest, or least expensive one, to execute. One factor that contributes to the cost of a particular execution plan is the number of rows that the execution plan, when executed, returns from the database tables.

One important aspect that influences the number of rows processed is the join order of the tables. In response to a query that requests data from multiple tables, the DBMS joins rows from these multiple tables (the rows are often concatenated horizontally into a result set), in order to find and retrieve the data from all the tables. Thus, a join operation is a relationship between two tables accessed by a query (a join query), and a join operation is performed to connect (or join) data from two or more tables, wherein the DBMS joins rows with particular attributes together to form a new row that the DBMS saves to the result set. The join order is typically specified by the execution plan and is the order in which the DBMS performs join operations when the DBMS executes the query via the execution plan, to retrieve and join rows of data from the database tables into the result set.

Join operations are typically implemented using a nested loop algorithm, where the resultant new rows from the first two tables in the join order are joined to the resultant rows from the third table, and those results are joined to the fourth table, etc. Eventually all of the needed join operations are complete, and the resultant new rows are stored to the result set that satisfies the query. Because a single join is limited to accessing two tables, multi-table joins are performed in sequence according to a particular order. Many different join queries may be implemented by joining the tables in any of several possible join orders. For example, a query that involves joining tables A, B, and C may be performed as a join of tables A and B followed by a join of the results of table A joined to table B and table C. Alternatively, the same query may be performed as a join of tables A and C followed by the join of the results of table A joined to table C and table B. The DBMS attempts to select a join order that eliminates the greatest number of rows from the potential result set early in the join processing, which saves the costs associated with repeatedly accessing tables later in the join operation.

The DBMS often evaluates certain characteristics about the tables A, B, and C, in an attempt to determine the best join order for the query. In particular, during runtime, one join operation may have a high fan-out rate in which each row of table A matches multiple rows in table B. If this join is performed first, then each of these matching rows will need to be joined to table C, thereby requiring a significant number of intermediate operations. Conversely, the other join operation may have a high fan-in rate in which each row of table A matches very few or zero rows in table C. If this join operation is performed first, then only a few rows need to be joined with table B, thereby saving a number of intermediate operations. One factor that affects the join order chosen for the execution plan and that affects other aspects of the execution plan is the amount and type of resources (e.g., memory or processors) available to the DBMS.

The operations of the DBMS may be performed as a part of a virtual machine that executes on a computer. The execution of the virtual machine may be started and stopped on a computer system, and the virtual machine may be moved between computer systems.

SUMMARY

A method, computer-readable storage medium, and computer system are provided. In an embodiment, a query implemented by a first execution plan is executed at a first virtual machine. In response to a move command that requests a move of the first virtual machine from a first computer to a second computer while the first virtual machine is executing the query implemented by the first execution plan at the first computer, an attribute of a resource used by the executing at the first virtual machine is saved to memory at the first computer and a driver source used by the executing at the first virtual machine is saved to the memory at the first computer. The driver source comprises a state of partial execution of the first execution plan. In response to a command that requests starting a second virtual machine at the second computer, a determination is made whether the driver source that comprises the state of the partial execution of the first execution plan exists in memory of the second computer.

It is to be noted, however, that the appended drawings illustrate only example embodiments of the invention, and are therefore not considered a limitation of the scope of other embodiments of the invention.

DETAILED DESCRIPTION

Figure 1:
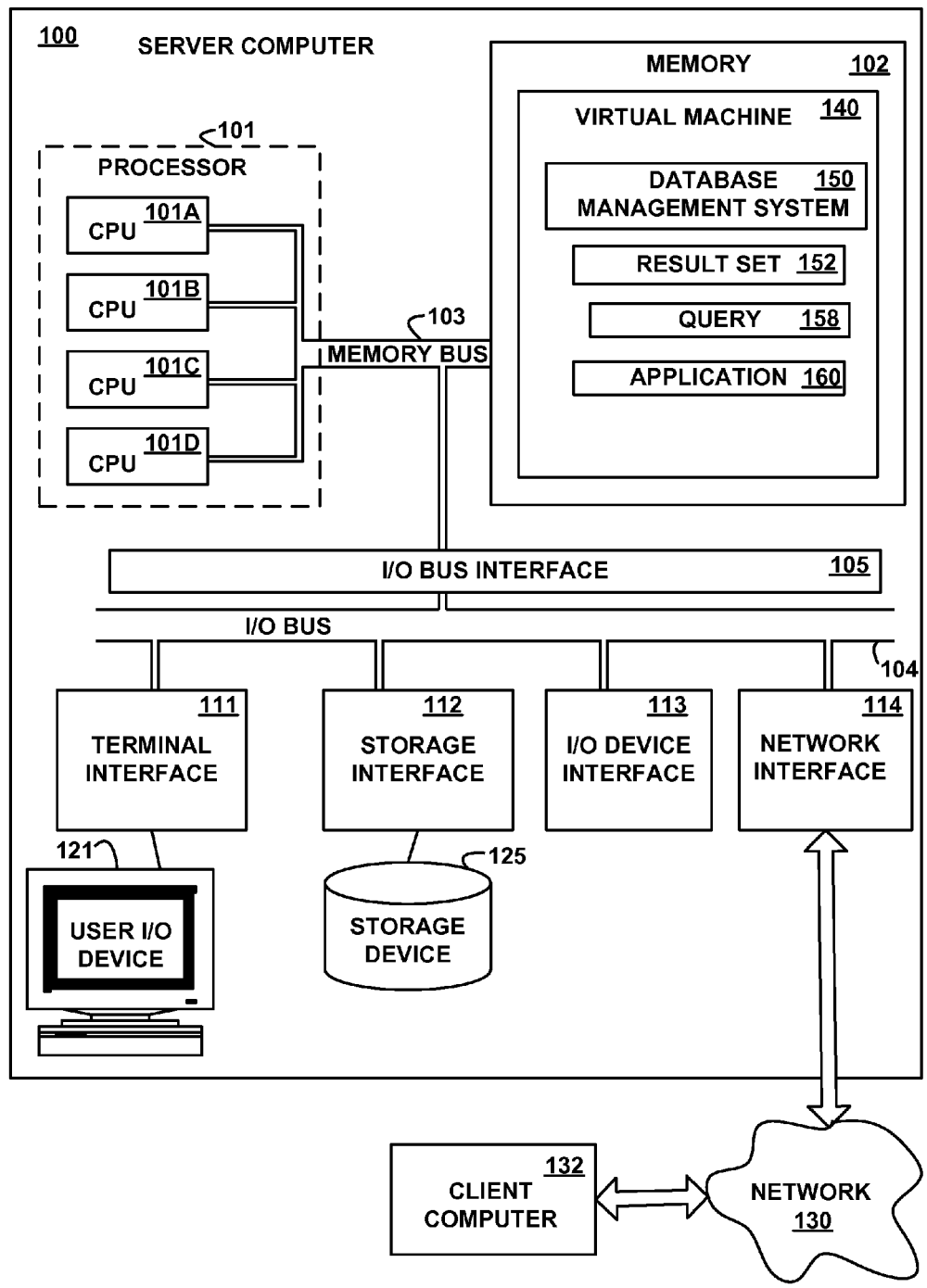
FIG. 1 depicts a high-level block diagram of an example system for implementing an embodiment of the invention.

Referring to the Drawings, wherein like numbers denote like parts throughout the several views, FIG. 1 depicts a high-level block diagram representation of a server computer system 100 connected to a client computer system 132 via a network 130, according to an embodiment of the present invention. The terms "server" and "client" are used herein for convenience only, and in various embodiments a computer system that operates as a client computer in one environment may operate as a server computer in another environment, and vice versa. The mechanisms and apparatus of embodiments of the present invention apply equally to any appropriate computing system.

The major components of the computer system 100 comprise one or more processors 101, a main memory 102, a terminal interface 111, a storage interface 112, an I/O (Input/Output) device interface 113, and a network adapter 114, all of which are communicatively coupled, directly or indirectly, for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may comprise one or more levels of on-board cache.

In an embodiment, the main memory 102 may comprise a random-access semiconductor memory, storage device, or storage medium (either volatile or non-volatile) for storing or encoding data and programs. In another embodiment, the main memory 102 represents the entire virtual memory of the computer system 100, and may also include the virtual memory of other computer systems coupled to the computer system 100 or connected via the network 130. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The main memory 102 stores or encodes a virtual machine 140. The virtual machine 140 comprises a database management system 150, a result set 152, a query 158, and an application 160. In an embodiment, the virtual machine 140 is a program implementation of a physical machine that executes programs. In various embodiments, the main memory 102 may store any number of virtual machines comprising the same or different database management systems, result sets, queries, and/or applications. Virtual machines allow the sharing of physical machine resources between different virtual machines, each running its own operating system (typically called guest operating systems), which may be the same or different from each other. Virtual machines may allow multiple operating system environments to co-exist on the same computer, in isolation from each other. Virtual machines may provide an instruction set architecture that is somewhat different from that of the underlying physical machine.

In an embodiment, the virtual machine 140 is implemented as a logical partition in a logically-partitioned computer. In another embodiment, the virtual machine 140 executes within a logical partition in a logically-partitioned computer, and the virtual machine 140 may move between logical partitions within the same logically-partitioned computer or different logically partitioned computers. Each logical partition in a logically-partitioned computer may comprise and utilize an OS (operating system), which controls the primary operations of the logical partition in the same manner as the operating system of a non-partitioned computer. Some or all of the operating systems may be the same or different from each other. Any number of logical partitions may be supported, and the number of the logical partitions resident at any time in the computer 100 may change dynamically as partitions are added or removed from the computer 100. A hypervisor may add, remove, start, and/or shutdown logical partitions and may allocate resources to and deallocate resources from the logical partitions.

Each logical partition comprises instructions that execute on the processor 101 in a separate, or independent, memory space, and thus each logical partition acts much the same as an independent, non-partitioned computer from the perspective of each application 160 that executes in each such logical partition. As such, the applications 160 typically do not require any special configuration for use in a partitioned environment.

Given the nature of logical partitions as separate virtual computers, it may be desirable to support inter-partition communication to permit the logical partitions to communicate with one another as if the logical partitions were on separate physical machines. As such, in an embodiment an unillustrated virtual local area network (LAN) adapter associated with a hypervisor permits the logical partitions to communicate with one another via a networking protocol. In another embodiment, the virtual network adapter may bridge to a physical adapter, such as the network adapter 114. Other manners of supporting communication between logical partitions may also be supported consistent with embodiments of the invention.

In an embodiment, the virtual machine 140, the DBMS 150 and/or the application 160 comprise instructions or statements that execute on the processor 101 or instructions or statements that are interpreted by instructions or statements that execute on the processor 101, to carry out the functions as further described below with reference to FIGS. 2, 3, 4, 5, 6, 7, 8, 9, and 10. In another embodiment, the virtual machine 140, the DBMS 150 and/or the application 160 are implemented in hardware via semiconductor devices, chips, logical gates, circuits, circuit cards, and/or other physical hardware devices in lieu of, or in addition to, a processor-based system. In an embodiment, the virtual machine 140, the DBMS 150 and/or the application 160 comprise data in addition to instructions or statements. In various embodiments, the application 160 is a user application, a third-party application, an operating system, or any portion, multiple, or combination thereof.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104.

The I/O interface units support communication with a variety of storage and I/O devices. For example, the terminal interface unit 111 supports the attachment of one or more user I/O devices 121, which may comprise user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 121 and the computer system 100, and may receive output data via the user output devices. For example, a user interface may be presented via the user I/O device 121, such as displayed on a display device, played via a speaker, or printed via a printer.

The storage interface unit 112 supports the attachment of one or more disk drives or direct access storage devices 125 (which are typically rotating magnetic disk drive storage devices, although they could alternatively be other storage devices, including arrays of disk drives configured to appear as a single large storage device to a host computer). In another embodiment, the storage device 125 may be implemented via any type of secondary storage device. The contents of the main memory 102, or any portion thereof, may be stored to and retrieved from the storage device 125, as needed. The I/O device interface 113 provides an interface to any of various other input/output devices or devices of other types, such as printers or fax machines. The network adapter 114 provides one or more communications paths from the computer system 100 to other digital devices and computer systems 132; such paths may comprise, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may, in fact, contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 is implemented as a desktop computer, portable computer, laptop or notebook computer, tablet computer, pocket computer, telephone, smart phone, pager, automobile, teleconferencing system, appliance, or any other appropriate type of electronic device.

The network 130 may be any suitable network or combination of networks and may support any appropriate protocol suitable for communication of data and/or code to/from the computer system 100 and the computer system 132. In various embodiments, the network 130 may represent a storage device or a combination of storage devices, either connected directly or indirectly to the computer system 100. In another embodiment, the network 130 may support wireless communications. In another embodiment, the network 130 may support hard-wired communications, such as a telephone line or cable. In another embodiment, the network 130 may be the Internet and may support IP (Internet Protocol). In another embodiment, the network 130 is implemented as a local area network (LAN) or a wide area network (WAN). In another embodiment, the network 130 is implemented as a hotspot service provider network. In another embodiment, the network 130 is implemented an intranet. In another embodiment, the network 130 is implemented as any appropriate cellular data network, cell-based radio network technology, or wireless network. In another embodiment, the network 130 is implemented as any suitable network or combination of networks. Although one network 130 is shown, in other embodiments any number of networks (of the same or different types) may be present.

The computer system 132 may comprise some or all of the hardware and/or computer program elements of the computer system 100.

FIG. 1 is intended to depict the representative major components of the computer system 100, the network 130, and the computer system 132. But, individual components may have greater complexity than represented in FIG. 1, components other than or in addition to those shown in FIG. 1 may be present, and the number, type, and configuration of such components may vary. Several particular examples of such additional complexity or additional variations are disclosed herein; these are by way of example only and are not necessarily the only such variations. The various program components illustrated in FIG. 1 and implementing various embodiments of the invention may be implemented in a number of manners, including using various computer applications, routines, components, programs, objects, modules, data structures, etc., and are referred to hereinafter as "computer programs," or simply "programs."

The computer programs comprise one or more instructions or statements that are resident at various times in various memory and storage devices in the computer system 100 and that, when read and executed by one or more processors in the computer system 100 or when interpreted by instructions that are executed by one or more processors, cause the computer system 100 to perform the actions necessary to execute steps or elements comprising the various aspects of embodiments of the invention. Aspects of embodiments of the invention may be embodied as a system, method, or computer program product. Accordingly, aspects of embodiments of the invention may take the form of an entirely hardware embodiment, an entirely program embodiment (including firmware, resident programs, micro-code, etc., which are stored in a storage device) or an embodiment combining program and hardware aspects that may all generally be referred to herein as a "circuit," "module," or "system." Further, embodiments of the invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (an non-exhaustive list) of the computer-readable storage media may comprise: an electrical connection having one or more wires, a portable computer diskette, a hard disk (e.g., the storage device 125), a random access memory (RAM) (e.g., the memory 102), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may comprise a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, Radio Frequency, or any suitable combination of the foregoing.

Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the invention are described below with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks.

The computer programs defining the functions of various embodiments of the invention may be delivered to a computer system via a variety of tangible computer-readable storage media that may be operatively or communicatively connected (directly or indirectly) to the processor or processors. The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which comprises one or more executable instructions for implementing the specified logical function(s). In some embodiments, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the invention may also be delivered as part of a service engagement with a client corporation, non-profit organization, government entity, or internal organizational structure. Aspects of these embodiments may comprise configuring a computer system to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described hereinafter may be identified based upon the application for which they are implemented in a specific embodiment of the invention. But, any particular program nomenclature that follows is used merely for convenience, and thus embodiments of the invention are not limited to use solely in any specific application identified and/or implied by such nomenclature. The exemplary environments illustrated in FIG. 1 are not intended to limit the present invention. Indeed, other alternative hardware and/or program environments may be used without departing from the scope of embodiments of the invention.

Figure 2:
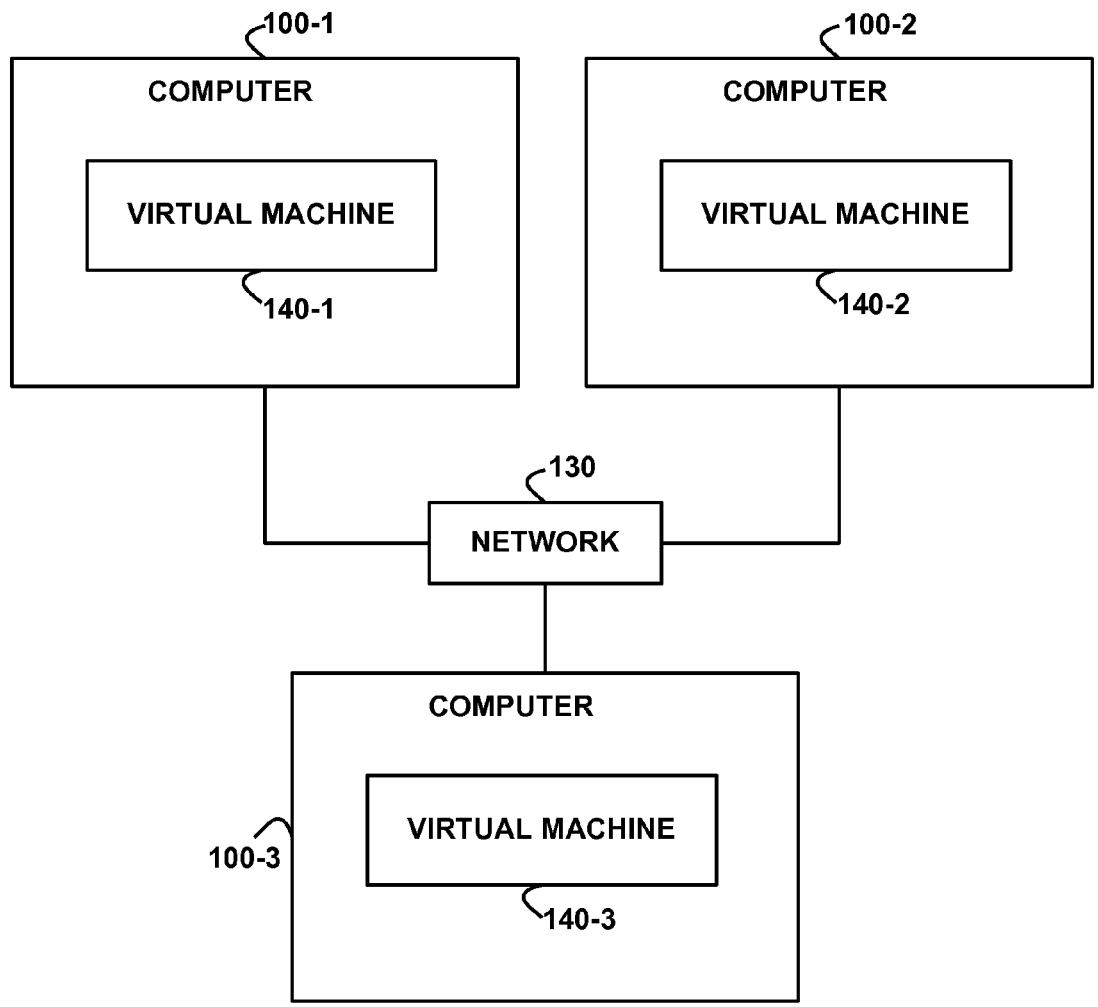
FIG. 2 depicts a network of computer systems, according to an embodiment of the invention.

FIG. 2 depicts a network of computer systems, according to an embodiment of the invention. The computer systems 100-1, 100-2, and 100-3 are connected via the network 130. The computer systems 100-1, 100-2, and 100-3 are examples of, and are generically referred to by, the computer system 100 (FIG. 1). The computer systems 100-1, 100-2, and 100-3 comprise respective virtual machines 140-1, 140-2, and 140-3, which are examples of, and are generically referred to by, the virtual machine 140 (FIG. 1). The virtual machines 140-1, 140-2, and 140-3 may be the same or different from each other. Although the virtual machines 140-1, 140-2, and 140-3 are illustrated as being implemented on different computers 100-1, 100-2, and 100-3, in other embodiments, some or all of the virtual machines 140-1, 140-2, and 140-3 may execute on the same computer. The virtual machines 140-1, 140-2, and 140-3 may be started, powered up, stopped, shutdown, powered down, and moved or copied between the different memory of the computer systems 100-1, 100-2, and 100-3.

Figure 3:
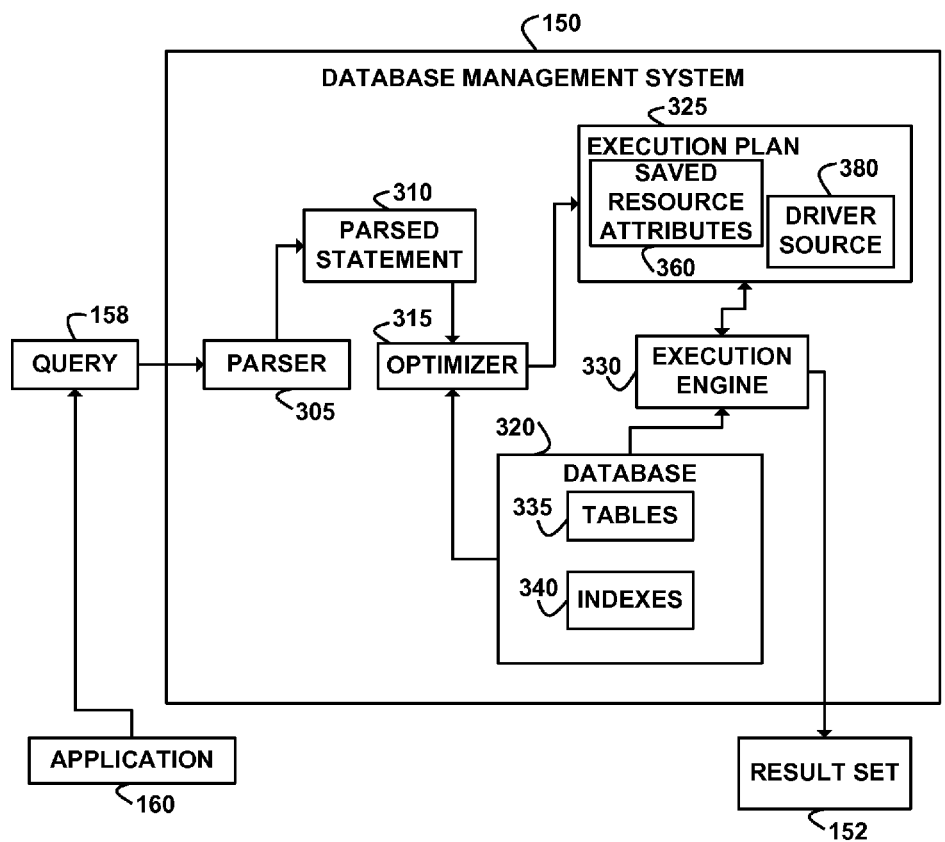
FIG. 3 depicts a block diagram of an example database management system, according to an embodiment of the invention.

FIG. 3 depicts a block diagram of an example database management system 150, according to an embodiment of the invention. The DBMS 150 comprises a parser 305, a optimizer 315, an execution engine 330 and a database 320. The database 320 comprises tables 335 and one or more indexes 340. The tables 335 organize data in rows, which represent individual entries, tuples, or records and columns, fields, or attributes, which define what is stored in each row, entry, tuple, or record. Each table 335 has a unique name within the database 320 and each column has a unique name within the particular table 335. The indexes 340 are data structures that inform the DBMS 150 of the location of a certain row in a table 335 in response to the indexes 340 receiving an indexed column value.

The parser 305 in the DBMS 150 receives the query 158 from the application 160. The query 158 requests that the DBMS 150 search for or find a row or combination of rows of data and store the data from those found rows into the result set 152 that meet or satisfy the criteria, keys, and or values specified by the query 158. In an embodiment, the application 160 sends the same query 158 multiple times to the DBMS 150, which may or may not result in a different result set 152, depending on whether the data in the DBMS 150 has changed between occurrences of the query 158. The parser 305 generates a parsed statement 310 from the query 158, which the parser 305 sends to the optimizer 315. The optimizer 315 performs query optimization on the parsed statement 310. As a result of query optimization, the optimizer 315 generates one or more execution plans 325, using data such as resource availability, platform capabilities, query content information, etc., that is stored in the database 320. Once generated, the optimizer 315 sends the execution plan 325 to the execution engine 330, which executes the query 158 using the execution plan 325 and the indexes 340, in order to find and retrieve the data in the database tables 335 in the database 320 that satisfies the criteria of the query 158. The execution engine 330 stores the resultant data that satisfies the criteria specified by the query 158 into the result set 152, which is returned to the application 160 as a response to the query 158. In an embodiment, the DBMS 150 stores various thresholds into the execution plan 325. The DBMS 150 may receive the various thresholds from the application 160, from a user, or from a database administrator, or the thresholds may be set by a designer of the optimizer 315.

The execution plan 325 comprises saved resource attributes 360 and a driver source 380. The saved resource attributes 360 specify, identify, describe, or characterize the attributes of resources that are allocated to the virtual machine 140 in which the database management system 150 executes the execution plan 325. In various embodiments, the saved resource attributes 360 may identify an amount of memory, a number and speed of processors or time slices of processors, speed and latency of storage devices, the number of disk arms, or network bandwidth allocated to the virtual machine 140 at the time that the database management system 150 in the virtual machine 140 executes the execution plan 325. The DBMS 150 saves the execution plan 325 to a non-volatile storage device, so that the execution plan 325 persists across power downs or shut downs of the virtual machine and of loss of electrical power to the computer system 100. Multiple execution plans 325 may exist that were created in different virtual machines and that were optimized for different amounts and types of resources that were allocated to the different virtual machines 140.

Figure 4:
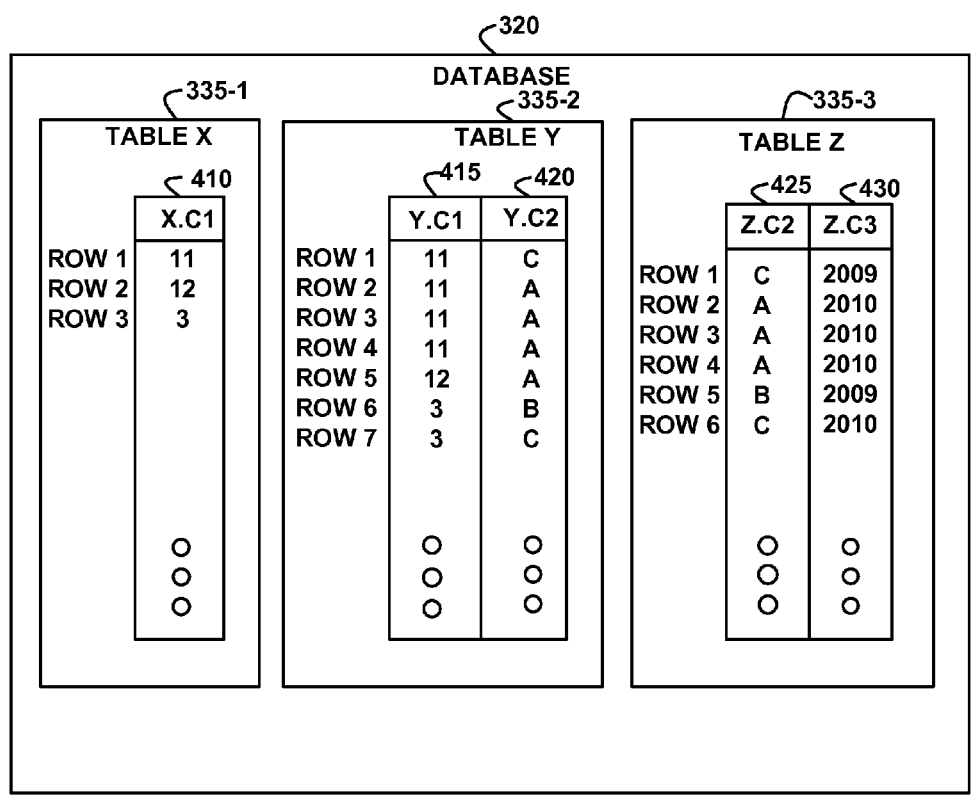
FIG. 4 depicts a block diagram of an example data structure for a database, according to an embodiment of the invention.

FIG. 4 depicts a block diagram of an example data structure for a database 320, according to an embodiment of the invention. The example database 320 comprises an example table x 335-1, an example table y 335-2, and an example table z 335-3. The table x 335-1 comprises the column x.c1 410. The table y 335-2 comprises the column y.c1 415 and the column y.c2 420. The table z 335-3 comprises the column z.c2 425 and the column z.c3 430. The columns 410 and 415 share the same column name or identifier "c1," and the columns 420 and 425 share the same column name or identifier "c2." Thus, the columns are uniquely identified herein using the notation x.c1 (referring to the column 410 in the table x 335-1), y.c1 (referring to the column 415 in the table y 335-2), y.c2 (referring to the column 420 in the table y 335-2), z.c2 (referring to column 425 in the table 335-3), and z.c3 (referring to the column 430 in the table 335-3).

Each table in the example database 320 is divided into rows and columns. For example, the table x 335-1 comprises a first row of (11) with "11" stored in the column x.c1 410; a second row of (12) with "12" stored in the column x.c1 410; a third row of (3) with "3" stored in the column x.c1 410, etc. The table x 335-1 illustrates row identifiers ("row 1," "row 2," "row 3," etc.), which identify the respective rows in the table. In another embodiment, the row identifiers are addresses (either absolute, relative, physical, logical, or virtual addresses) that identify the storage location of the respective row. In an embodiment, the row identifiers are pointed to by addresses or identifiers in the index 340. In another embodiment, the row identifiers are unique values in a column. Row identifiers exist for all of the tables and rows.

As another example, the table Y 335-2 comprises a first row of (11, C) with "11" stored in the column y.c1 415 and "C" stored in the column y.c2 420; a second row of (11, A) with "11" stored in the column y.c1 415 and "A" stored in the column y.c2 420; a third row of (11, A) with "11" stored in the column y.c1 415 and "A" stored in the column y.c2 420, etc.

As another example, the table z 335-3 comprises a first row of (C, 2009) with "C" stored in the column z.c2 425 and "2009" stored in the column z.c3 430; a second row of (A, 2010) with "A" stored in the column z.c2 425 and "2010" stored in the column z.c3 430; a third row of (A, 2010) with "A" stored in the column z.c2 425 and "2010" stored in the column z.c3 430, etc.

Figure 5:
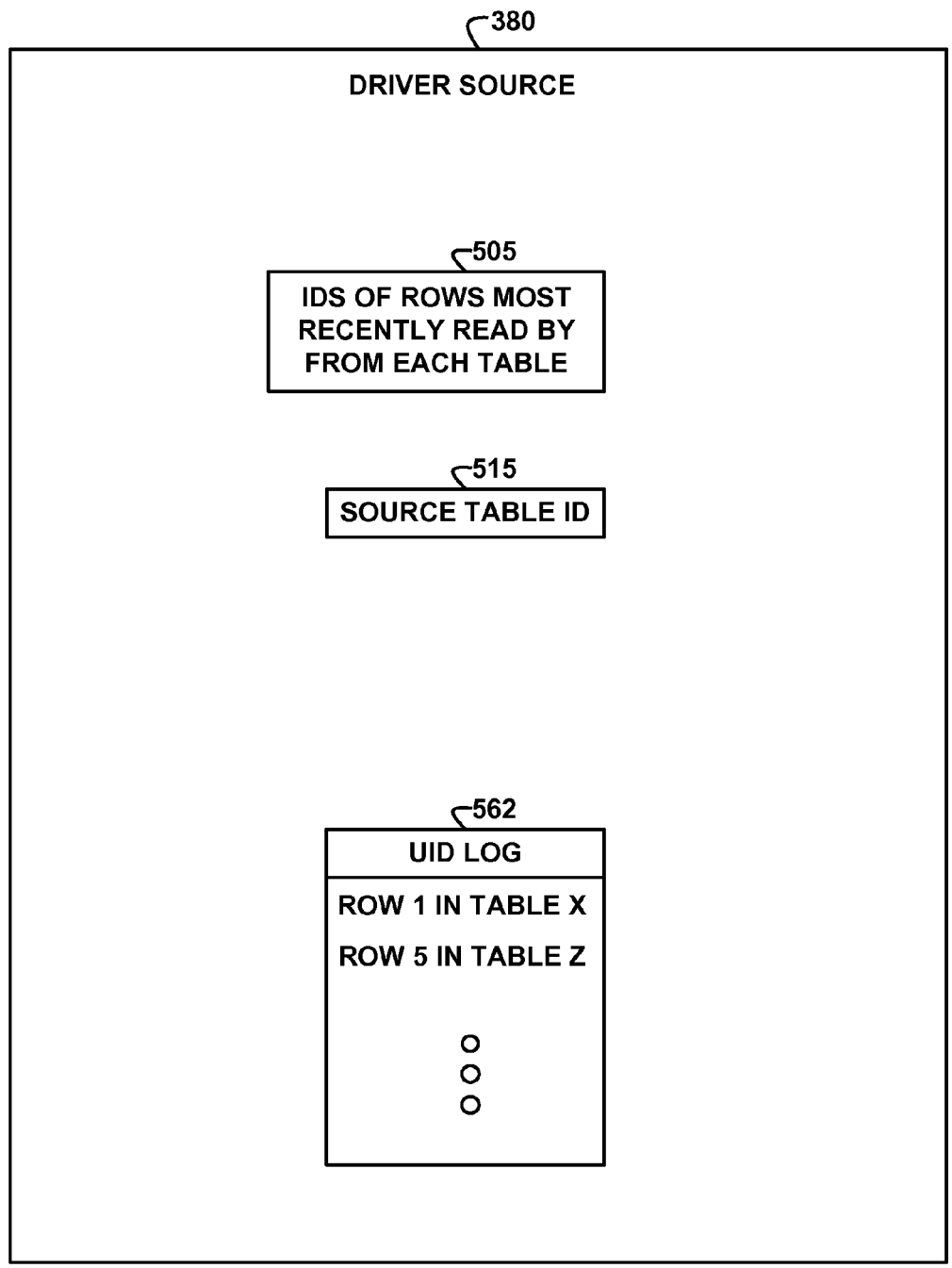
FIG. 5 depicts a block diagram of an example data structure for a driver source, according to an embodiment of the invention.

FIG. 5 depicts a block diagram of an example data structure for a driver source 380, according to an embodiment of the invention. The driver source 380 comprises identifiers 505 of rows most recently read (the most recent row read) from each table in the database, a source table identifier 515, and a unique identifier (UID) log 562. Although FIG. 5 illustrates the driver source 380 as comprising the UID log 562, in another embodiment, the UID log 562 is implemented in a different object, and the driver source 380 comprises a pointer to, or an identifier of, the UID log 562. The identifiers 505 specify, for each table, the current row that the DBMS 150 most recently read from that table while executing the execution plan 325. Thus, the identifiers 505 specify the current state of execution of the execution plan 325 and also specify the location within each table of where to resume or continue executing the execution plan 325 because the next row following the current row (in row number order within the respective table) is the next row in that table that is to be read by the execution of the execution plan 325. In an embodiment, the identifiers 505 are optional, not present, or not used, and the DBMS 150 resumes executing the execution plan 325 after the row identified by the last entry, or the entry most recently added, in the UID log 562.

In an embodiment, the UID log 562 comprises unique identifiers that uniquely identify the rows from a source table in the database 320 that are in the result set 152 and that satisfy the query 158. In an embodiment, the UID log 562 also comprises unique identifiers of rows from the source table in the database 320 that have been processed by the execution of an execution plan 325, but have not been added to the result set 152 because those rows do not satisfy the query 158. Being processed means that the DBMS 150 has read the rows, compared the read rows to the criteria of the query 158, and determined that the rows do not satisfy the criteria of the query 158. In various embodiments, a unique identifier comprises a row identifier, a column identifier, a unique value of a row in a column, and/or a table identifier, or any combination or multiple thereof. A source table is the one designated table in the join order of an execution plan 325 that is designated by the source table identifier 515. In an embodiment, the DBMS 150 designates the source table as the first table in the join order of an execution plan 325, and each execution plan 325 that implements the same query 158 may have a different join order and a different designated source table.

In another embodiment, each execution plan 325 that implements the same query 158 is different, but has a same join order. An example of execution plans that are different but have the same join order is execution plans that specify accessing the same table in different ways, such as a scan of an index of a table and randomly accessing the table using the index value in one execution plan versus a scan of the table (from beginning to end in row order) without using the index in another execution plan. Another example is execution plans that have a different degree of parallelism, such as an execution plan that specifies using one task to execute the execution plan versus another execution plan that specifies using two tasks in parallel execution.

The example data shown in FIG. 5 illustrates that the UID log 562 comprises identifiers of rows from different tables that were identified as source tables by different execution plans. Thus, in an embodiment, the execution of all execution plans 325 read and write the unique identifiers to the same UID log 562. In another embodiment, the execution of each execution plan 325 stores unique identifiers to its own UID log and reads unique identifiers from all UID logs of all other execution plans 325.

In an embodiment, execution of an execution plan 325 does not add unique identifiers to the UID log 562 until the DBMS 150 executes in another virtual machine that executes another execution plan 325 that implements the same query. Once the DBMS 150 is executing in another virtual machine that executes the same query, various embodiments include: rescanning the driver source, comparing the unique identifiers in the driver source to the UIDs of the returned rows in the result set 152, and adding the unique identifiers that satisfy the query 158 to the UID log 562; or restarting the execution of the original execution plan 325 and then storing the unique identifiers to the UID log 562.

Figure 6:
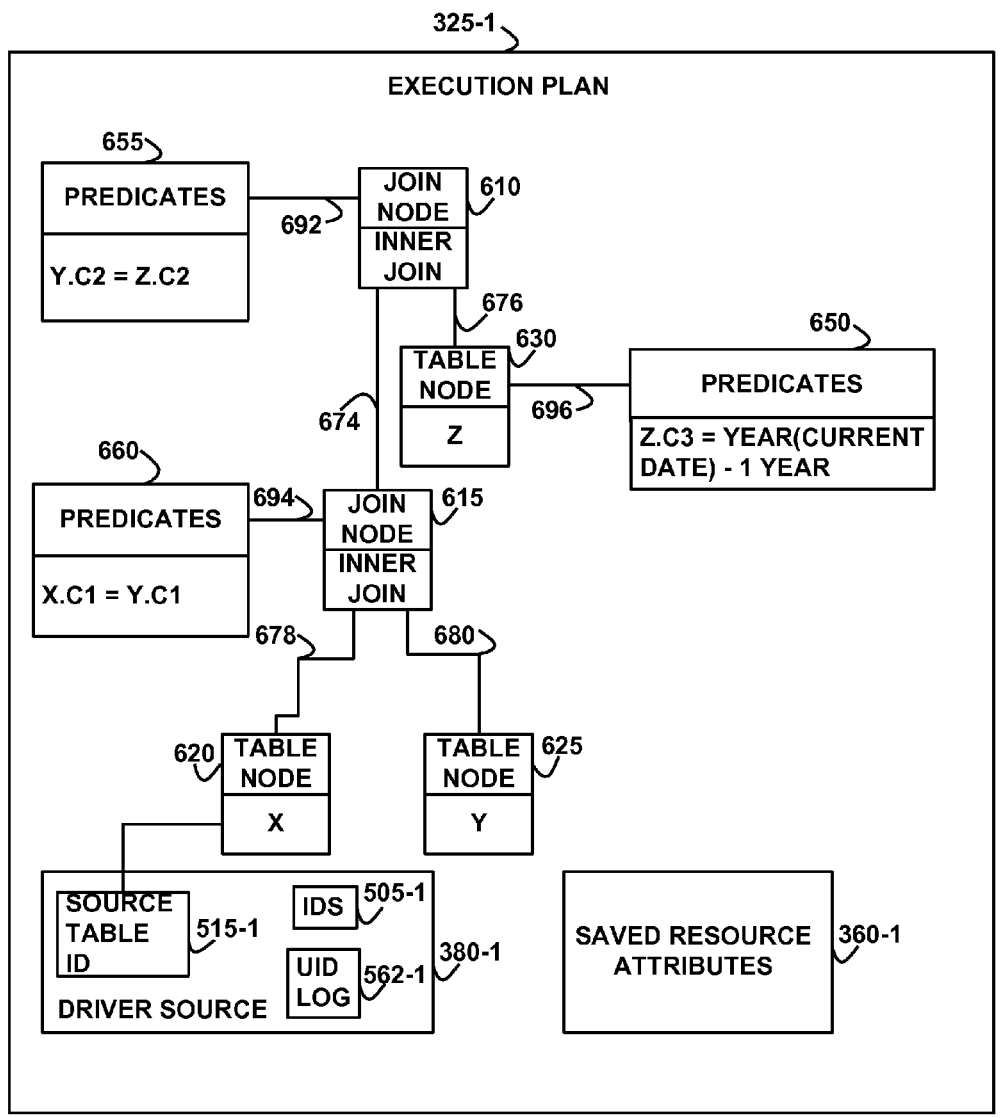
FIG. 6 depicts a block diagram of an example data structure for an execution plan that implements a query with a first join order and a first driver source, according to an embodiment of the invention.

FIG. 6 depicts a block diagram of an example execution plan 325-1 that implements a query with a first join order, a first driver source 380-1, and a first saved resource attributes 360-1, according to an embodiment of the invention. The execution plan 325-1 is an example of, and is generically referred to by, the execution plan 325 (FIG. 3). The driver source 380-1 is an example of, and is generically referred to by, the driver source 380 (FIG. 3). The saved resource attributes 360-1 is an example of, and is generically referred to by, the saved resource attributes 360 (FIG. 3).

The execution plan 325-1 comprises a tree graph, representing the join operations that implement the query 158 when executed. The tree graph of the execution plan 325-1 comprises join nodes 610 and 615; table nodes 620, 625, and 630; predicates 650, 655, and 660; links 674, 676, 678, and 680; and links 692, 694, and 696. The table node 620 represents the table x 335-1. The table node 625 represents the table y 335-2. The table node 630 represents the table z 335-3. The execution plan 325-1 further comprises a driver source 380-1 comprising a source table identifier 515-1, which identifies the table represented by the table node 620 as the source table, identifiers 505-1, and a UID log 562-1. In other embodiments, the source table identifier 515-1 is optional or not used. For example, the DBMS 150 may use the table represented by the first table node in the join order as the source table. As another example, the DBMS 150 may add a clause to the predicates 660 indicating that, in order for the predicates 660 to be satisfied, the unique identifiers of rows from the first table in the join order must not already be present in the UID log 562-1, which causes the execution of the execution plan 325-1 to not save rows to the result set 152 that have already been saved to the result set 152 by the execution of another execution plan 325. The source table identifier 515-1 is an example of, and is generically referred to by the source table identifier 515 (FIG. 5). The identifiers 505-1 are examples of, and are generically referred to by, the identifiers 505 (FIG. 5). The UID log 562-1 is an example of, and is generically referred to by, the UID log 562 (FIG. 5).

A tree graph takes its name from an analogy to trees in nature, which have a hierarchical organization of branches and leaves. For example, a leaf is connected to a small branch, which further is connected to a large branch, and all branches of the tree have a common starting point at the root. Analogously, the nodes 610, 615, 620, 625, and 630 in the tree graph of the execution plan 325-1 have a hierarchical organization, in that the join node 610 has a relationship with another join node 615, which itself may have a further relationship with another node, and so on. Thus, the nodes may be divided into groups and sub-groups, which ultimately all have a relationship to the root or head node 610. To define a tree more formally, a tree data structure defines the hierarchical organization of nodes. Hence, a tree is a finite set, T, of one or more of nodes, such that a) one specially designated node is called the root of the entire tree; and b) the remaining nodes (excluding the root) are partitioned into m>=0 disjoint sets $T_1, \ldots$ Tm, and each of these sets is in turn a tree. The trees T1, . . . , Tm are called the subtrees of the root.

Thus, every node in a tree is the root of some subtree contained in the whole tree. The number of subtrees of a node is called the degree of that node. A node of degree zero is called a terminal compute node or a leaf. A non-terminal node is called a branch node. The level of a node with respect to T is defined by saying that the root node has level 0, and other nodes have a level that is one higher than they have with respect to the subtree that contains them. Each root is the parent of the roots of its subtrees, the latter are siblings, and they are also the children of their parent. Each root is an ancestor of all of the nodes in all of the root's subtrees. The nodes in the subtrees of a root node are the root's descendants. The root node of the entire tree has no parent node.

A tree graph, with parent and child nodes, is merely a logical representation of a query execution, which aids in understanding how the execution engine 330 executes a particular query 158. But, the execution plan 325-1 generated by the optimizer 315 may comprise code understandable and executable by the execution engine 330. This code does not require parent nodes and child nodes but, instead, comprises logic that is represented by a tree graph model having such nodes and connections and may be implemented as other types of data structures as well. Accordingly, while embodiments of the invention are described herein using such tree graph terminology, actual creation and modification of a tree graph are not required.

Using the example tree of the execution plan 325-1 of FIG. 6, the root node is the node 610. The root node 610 is the parent of its child nodes 615 and 630. The node 615 is the parent of its child nodes 620 and 625. The nodes 620, 625, and 630 have no child nodes, so they are leaf nodes. The ancestors of the node 620 are the nodes 615 and 610. The ancestors of the node 625 are the nodes 615 and 610. The ancestor of the node 630 is the node 610. The root node 610 has no ancestors. The links 674, 676, 678, and 680 each connect, point to, or contain the address of two adjacent nodes, and allow the DBMS 150 to find the child nodes of a parent node and find the parent node of a child node. The links 692, 694, and 696 each connect to, point to, or contain the address of a predicate, and allow the DBMS 150 to find the predicate of a node. In this example, the example query 158 that the example execution plan 325-1 implements may be expressed as: "select * from x, y, z, where x.c1=y.c1 and y.c2=z.c2 and z.c3=year (current date)−1 year." The tree graph of the execution plan 325-1 illustrates one example implementation and one example join order for the example query 158, but other implementations and join orders for this query 158 also exist, including embodiments that do not use a tree and that do not use a graph.

Each of the predicates 650, 655, and 660 is connected to a respective node 630, 610, and 615. The predicates 650, 655, and 660 each represent a portion of the query 158 and comprise respective conditional criteria expressions, which the DBMS 150 evaluates to either true or false by substituting data from the rows retrieved from the table nodes (that are connected to the predicate or that are the child node of a join node that is connected to the predicate) into variables in the expression that match column identifiers in the rows. In various embodiments, the predicates specify any multiple, and/or combination of: data; columns, fields, or keys; functions, calls, invocations, methods, classes, or applets; relational operators (e.g., greater than, less than, equal to, not equal to, greater than or equal to, less than or equal to, or any other relational operator); logical operators (e.g., AND, OR, XOR, NOT, NOR, NAND, or any other logical operator); arithmetic operators (e.g., multiplication, division, addition, subtraction, bases, powers, logarithms, or any other arithmetic operators); and register operations (e.g., shift left, shift right operations, or any other register operation); and the relational operators, the logical operators, the arithmetic operators, and the register operations may have any number of arguments or operands (e.g., they may be unary, binary, ternary, or n-ary).

The DBMS 150 reads a join node, and in response, reads a row from a child table node or nodes of the join node, substitutes the data from the columns in the read row(s) that has the same table and column identifier as specified in the predicate that is connected to the join node, and evaluates the resultant predicate expression to either true or false. If the predicate expression evaluates to true, then the read row satisfies or meets the connected predicate, so the DBMS 150 saves the read row to the result set 152 if the unique identifier of the row from the driver source is not already in the UID log 562. If the unique identifier of the row from the driver source is already in the UID log 562, then the DBMS 150 does not add the row to the result set 152. If the predicate expression evaluates to false, then the read row does not satisfy or meet the predicate, so the DBMS 150 excludes the read row from the result set 152.

The join nodes represent join operations of tables whose rows satisfy the connected predicate. In various embodiments, the join operations may comprise inner joins, equijoins, natural joins, outer joins, left outer joins, right outer joins, full outer joins, exception joins, and self joins. An inner join between two tables results in only the rows matching certain selection criteria to be returned in the result set 152. An outer join, such as a left join of a table A and a table B (according to a set of selection criteria) returns all matching rows as well as those rows in table A not having a match in table B. The matching rows have the values of all their fields populated by the data from table A and table B. But, the non-matching rows from table A will have a null value, or other default character, in the fields from table B. Another outer join, such as a right join of table A and table B, also returns all the matching rows but, unlike the left join, returns those rows in table B not having a matching row in table A. An exception join of table A and table B returns a result set 152 of those rows in table A for which no matching row in table B exists.

The join node 615 represents a join operation of the tables represented by the child table nodes 620 and 625 using the connected predicates 660. The join node 610 represents a join operation using the predicates 655 of the intermediate result set returned by the join operation of the join node 615 and another intermediate result set created by the child table node 630 using the predicates 650. In an embodiment, the join nodes represent logic in the DBMS 150 that performs the join operation that finds rows in the child table nodes, whose column values satisfy the criteria of the predicates when the logic of the join node substitutes the column values of the found rows into the placeholders or variables in the predicates that have the same name or identifier as the column identifiers in the rows.

In operation, the DBMS 150 executes the query 158 using the execution plan 325-1 as follows. The DBMS 150 begins traversing the nodes at the root or head node and encounters (reads) the head join node 610. Since the join node 610 is not a table node, the DBMS 150 travels to the left child join node 615 of the join node 610 via the link 674, in search of a first row. The DBMS 150 then encounters (reads) the join node 615. Since the join node 615 is not a table node, the DBMS 150 again travels to the left child node 620 of the node 615 via the link 678, in search of a first row. The DBMS 150 then encounters the table node 620 and retrieves the first row from the table represented by the table node 620, using a scan operation. In a scan operation, the DBMS 150 reads rows from the beginning to the end of a table, without using the index 340 to randomly access the table.

The DBMS 150 then travels to the right child node 625 of the node 615, encounters (reads) the table node 625, and searches for a second row in the table identified by the table node 625 that satisfies the selection criteria of the connected predicates 660 of the join node 615. If the DBMS 150 does not find a second row in the table identified by the table node 625 that satisfies the selection criteria of the connected predicates 660 of the join node 615, then the DBMS 150 returns to the table node 620 and scans the table x for the next row and returns to the table node 625 and once again searches for a second row in the table y identified by the table node 625 that satisfies the selection criteria of the predicates 660 of the join node 615.

Once a matching row in the table identified by the table node 625 is identified that satisfies the selection criteria of the predicates 660, the DBMS 150 returns the found first row (read in a scan operation from the table represented by the node 620) and the second row (read from the table node 625) in an intermediate result set to the join node 610. The DBMS 150 then travels to the right child table node 630 and searches for a third row in the table z identified by the table node 630 that satisfies or meets the predicates 650 and 655. Notice that, in determining whether or not a row in the table Z satisfies the predicates 655, the DBMS 150 uses the second row that was found in the table node 625 and was returned in the intermediate result set, in order to compare y.c2=z.c2. If the DBMS 150 does not find a row in the table identified by the table node 630 that satisfies the predicates 650 and 655 for the intermediate result set returned from the join node 615, then the DBMS 150 returns to the join node 615 and re-performs the join, retrieving the next row from the table x (identified by the table node 620) and finding a row in the table y (identified by the table node 625) that satisfies the predicates 660 before returning to the join node 610 and once again searching for a third row in the table z (identified by the table node 630) that meets the predicates 650 and 655.

Once the DBMS 150 has found a third row in the table z (identified by the table node 630) that satisfies the criteria of the predicates 650 and 655, the DBMS 150 returns the intermediate result set of the first row from the table x, the second row from the table y, and the third row from the table z that meets the criteria of the predicates 650, 655, and 660 to the join node 610. The DBMS 150 then adds the rows that meet the predicates to the result set 152 and adds the unique identifier that identifies the rows from the source table to the UID log 562-1, as previously described above with reference to FIG. 5.

Once all rows in the table z are scanned and any matches are processed by the DBMS 150 at the join node 610, the DBMS 150 retrieves the next row from the table x, and repeats the aforementioned sequence of operations. Thus, the table node 620 representing the table x 335-1 is the first table in the join order of the execution plan 325-1 because the DBMS 150 scans rows from the table x 335-1 prior to reading rows from any of the other tables (represented by the nodes 625 and 630) in the join order. The DBMS 150 designates the table x 335-1 represented by the table node 620 as the source table for the execution plan 325-1 because the table node 620 is first in the join order. In another embodiment, the DBMS 150 designates any appropriate table as the source table. The table y 335-2 represented by the node 625 is second in the join order because the DBMS 150 reads rows from the table y 335-2 after reading rows from the table x in order to determine if the predicates 660 are satisfied and prior to reading rows from the table z 335-3, represented by the table node 630. The table z 335-3 represented by the node 630 is the third, or last, table in the join order because the DBMS 150 reads rows from the table z 335-3 after reading rows from the table x 335-1 and the table y 335-2, in order to determine if the predicates 650 and 655 are satisfied.

Figure 7:
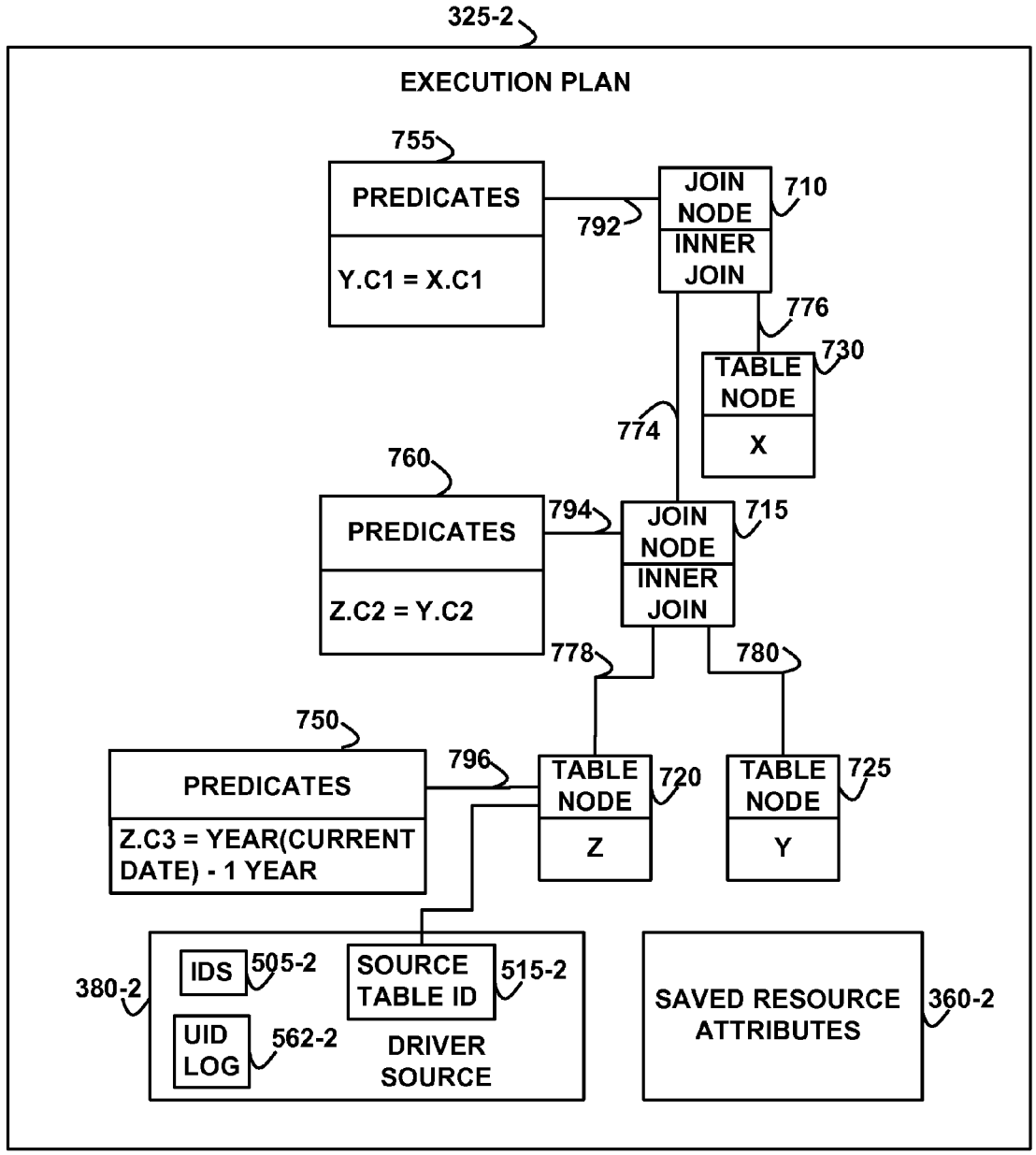
FIG. 7 depicts a block diagram of another example data structure for an execution plan that implements the query with a second join order and a second driver source, according to an embodiment of the invention.

FIG. 7 depicts a block diagram of another example execution plan 325-2 that implements the query 158 with a second join order, a second driver source 380-2, and a second saved resource attributes 360-2, according to an embodiment of the invention. In this example, the query 158 that the execution plan 325-2 implements is the same as the query 158 implemented by the execution plan 325-1 (FIG. 6), but the execution plan 325-2 has a different join order, a different driver source 380-2, and/or a different saved resource attributes 360-2 than the execution plan 325-1. The DBMS 150 created the example execution plan 325-2 in response to optimizing the execution plan 325-2 for different resources allocated to the virtual machine 140 that executes the execution plan 325-2 than the resources that were allocated to the virtual machine 140 that executes the execution plan 325-1 (FIG. 6).

The execution plan 325-2 is an example of the execution plan 325 (FIG. 3). The execution plan 325-2 comprises a tree graph, representing the join operations that implement the query 158 when executed. The tree graph of the execution plan 325-2 comprises join nodes 710 and 715; table nodes 720, 725, and 730; predicates 750, 755, and 760; links 774, 776, 778, and 780; and links 792, 794, and 796. The table node 720 represents the table z 335-3. The table node 725 represents the table y 335-2. The table node 730 represents the table x 335-1. The execution plan 325-2 further comprises a driver source 380-2 comprising a source table identifier 515-2 that identifies the table represented by the table node 720 as the source table. In other embodiments, the source table identifier 515-2 is optional or not used. In the execution plan 325-2, the table node 720 is first in the join order, the table node 725 is second in the join order, and the table node 730 is third and last in the join order.

Using the example data in the database 320 illustrated in FIG. 4 with the example execution plan 325-1 (FIG. 6), the DBMS 150 returns a row to the result set 152 that comprises the "row 1" from each of the table x 335-1, the table y 335-2, and the table z 335-3. Since the source table in the execution plan 325-1 is represented by the table node 620, the DBMS 150 stores an indication of the row 1 of the table x to the UID log 562. The DBMS 150 then reads the "row 6" from the table z 335-3, but discards this row and does not add it to the result set 152 because although the predicate 655 is satisfied (y.c2 of "C" in "row 1" of table y 335-2 equals z.c2 of "C" in "row 6" of table z 335-3), the predicate 650 is not satisfied by z.c3 of "2010" if the current year is 2010. The DBMS 150 then reads and ultimately discards "row 2" of table y 335-3 because "row 2" in the table z 335-3 (which contain a value of "A" in column z.c2 425 that matches the value of "A" in y.c2 420, satisfying the predicate 655) contains a value of "2010" in the column z.c3 430 of "2010," which does not satisfy the predicate 650. The DBMS 150 then reads and ultimately discards "row 3" and "row 4" of the table y 335-2 for the same reason.

In response to a virtual machine 140 subsequently starting executing that contains the execution plan 325-1, the DBMS 150 in that virtual machine 140 finds and reads the execution plan 325-1 and determines whether the saved resource attributes 360-1 in the execution plan 325-1 are substantially different (if the attributes are different by more than a threshold value) from the attributes of the resources allocated to the newly-starting virtual machine 140. If the attributes are substantially different, the DBMS 150 creates a different execution plan 325, such as the execution plan 325-2 of FIG. 7 and continues execution of the query using the execution plan 325-2, starting from the state of the partial execution of the query, as indicated by the identifiers 505-1 and the UID log 562-1 in the driver source 380-1 of the execution plan 325-1. The execution plan 325-2 (FIG. 7) has a different join order and a different source table identifier 515-2 than does the execution plan 325-1.

The execution of the execution plan 325-2 finds the same "row 1" from each table that satisfies the predicates 750, 755, and 760 that was previously found by the execution plan 325-1, but the execution of the execution plan 325-2 discards "row 1" from each table and does not add them to the result set 152 because "row 1" of table x is already identified in the UID log 562. The execution of the execution plan 325-2 then continues scanning the table z 335-3 (identified by the table node 720, which is the first table node in the join order) and discards "row 2," "row 3," and "row 4," as not meeting the predicates 750. The execution of the execution plan 325-2 then continues scanning the table z 335-3 and finds "row 5," which satisfies the predicates 750. The execution of the execution plan 325-2 then finds "row 6" in the table y 335-2 that satisfies the predicates 760 ("B" in y.c2 420 of table y 335-2 matches "B" in z.c2 425 of row 5 of table z 335-3), and "row 3" in table x 335-1 satisfies the predicates 755 ("3" in "row 6" of y.c1 415 in the table y 335-2 matches "3" in "row 3" of x.c1 410 in the table x 335-1). Since the UID of the "row 5" in the table z 335-3 is not present in the UID log 562, the execution of the execution plan 325-2 adds the UID of the "row 5" in the table z 335-3 to the UID log 562 and adds the returned rows to the result set 152. Thus in an embodiment, the DBMS 150 in a second virtual machine may restart or resume execution of a query that was originally started in a first virtual machine without losing the results of the previous partial execution and may optimize execution of the query in the second virtual machine for the resources that are allocated to the second virtual machine, which may be different from the resources allocated to the first virtual machine, which increases query performance.

Figure 8:
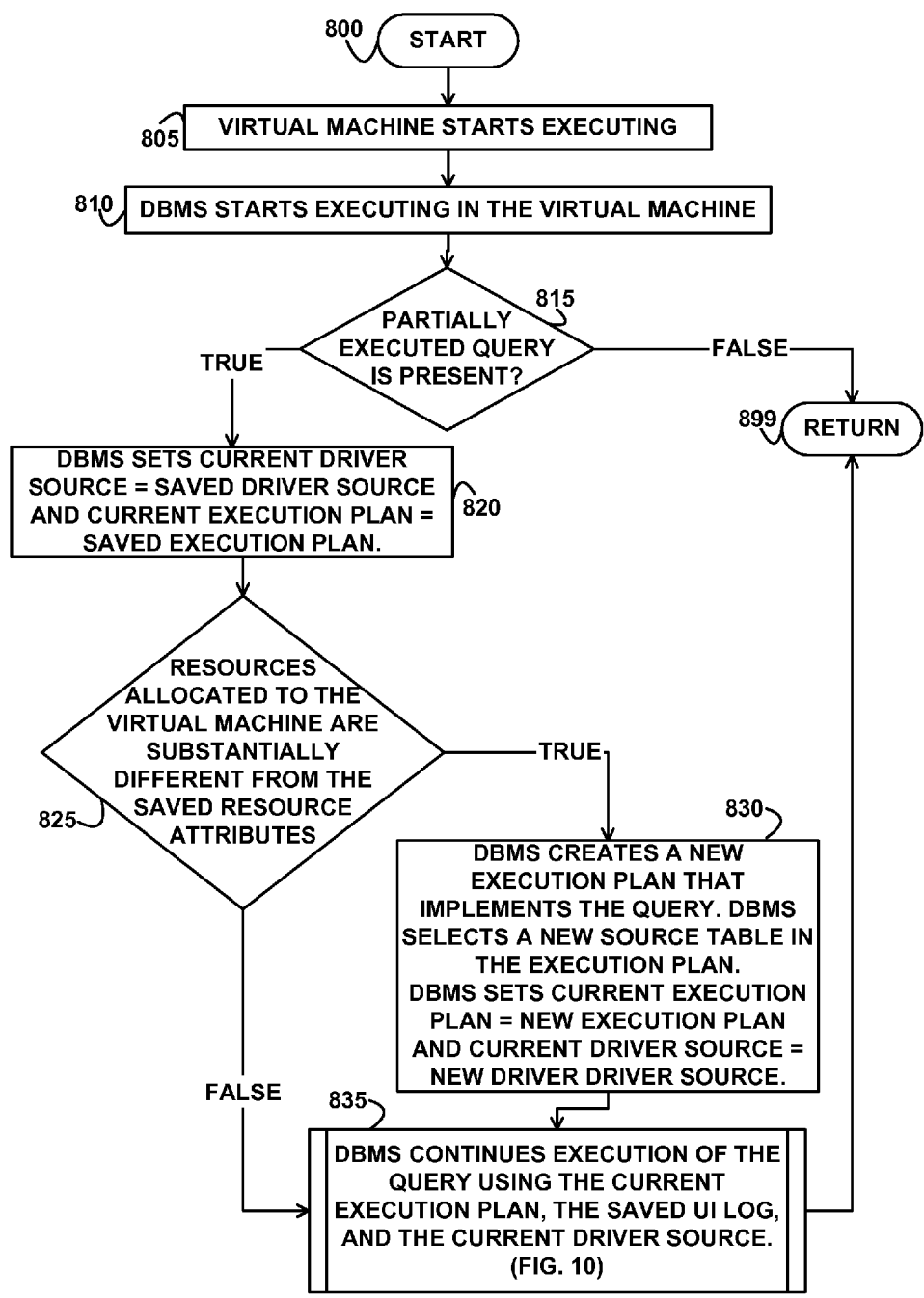
FIG. 8 depicts a flowchart of example processing for starting execution of a virtual machine, according to an embodiment of the invention.

FIG. 8 depicts a flowchart of example processing for starting execution of a virtual machine, according to an embodiment of the invention. Control begins at block 800. Control then continues to block 805 where the virtual machine 140 starts executing on the processor of a computer 100. Control then continues to block 810 where the DBMS 150 starts executing in the virtual machine 140. Control then continues to block 815 where the DBMS 150 determines whether a partially executed query is present in the memory 102 allocated to the virtual machine 140 on the computer 100 in which the DBMS 150 executes. In an embodiment, the DBMS 150 determines whether a saved execution plan 325 exists in the memory 102 allocated to the virtual machine 140 with a driver source 380 that has a UID log 562 that contains row identifiers. In another embodiment, in response to a shutdown command, the DBMS 150 writes information to a query log that indicates which queries were executing at the time of the shutdown, and in response to the start of execution of the virtual machine 140, the DBMS 150 reads the query log and checks the written information to determine whether a partially executed query exists.

If the determination at block 815 is true, then a partially executed query is present in the memory 102 allocated to the virtual machine 140 in which the DBMS 150 executes, as indicated by a saved execution plan 325 with a driver source 380 that has a UID log 562 that contains row identifiers or as indicated by a query log (the saved execution plan that is detected was saved in response to a move, shutdown, or resource attribute change, as further described below with reference to FIG. 10), so control continues to block 820 where the DBMS 150 sets the current driver source to be the saved driver source and sets the current execution plan to be the saved execution plan with the partially executed query.

Control then continues to block 825 where the DBMS 150 determines whether the attributes of the resources allocated to the virtual machine are substantially different than the saved resource attributes in the current execution plan (the partially executed query). In an embodiment, the DBMS 150 determines whether the difference between the amount of the allocated resources and the amount of the saved resource attributes 360 is greater than a threshold difference. In various embodiments, the threshold difference may be set by a designer of the DBMS 150, may be received from the application 160, or may be received from the client computer 132 via the network 130. Although the determination of block 825 is illustrated as being in response to the start of execution of a virtual machine, in other embodiments, the determination may be in response to a resizing of the virtual machine or moving the virtual machine from a first computer to a second computer. A resize operation changes the amount of resources allocated to a virtual machine. In various embodiments, a move operation copies a virtual machine from a first computer to a second computer while the virtual machine at the first computer continues to execute or after the virtual machine at the first computer has been shut down and stopped executing. In an embodiment, both resize and move operations may result in different amounts of resources being allocated to a virtual machine.

If the determination at block 825 is true, then the attributes of the resources allocated to the virtual machine 140 are substantially different than the saved resource attributes in the current execution plan, so control continues to block 830 where the DBMS 150 creates a new execution plan that implements the query, optimizing the new execution plan for the resources allocated to the virtual machine 140. The DBMS 150 selects a new source table in the newly created execution plan. The DBMS 150 sets the current execution plan to be the new execution plan and sets the current driver source to be the new driver source. Control then continues to block 835 where the DBMS 150 continues execution of the query using the current execution plan, the saved UI log, and the current driver source, as further described below with reference to FIG. 10. Control then continues to block 899 where the logic of FIG. 8 returns.

If the determination at block 825 is false, then the attributes of the resources allocated to the virtual machine 140 are not substantially different than the saved resource attributes in the current execution plan, so control continues to block 835, as previously described above, without creating a new execution plan. Instead, the DBMS 150 continues execution of the query using the previous execution plan, starting at the rows identified by the identifiers 505 in the driver source 380 of the previous execution plan.

If the determination at block 815 is false, then a partially executed query is not present in the memory allocated to the virtual machine 140 in which the DBMS 150 executes, and a saved execution plan 325 does not exist with a UID log 562 that contains row identifiers or the query log indicates that no partially executed queries exist, so control continues to block 899 where the logic of FIG. 8 returns.

Figure 9:
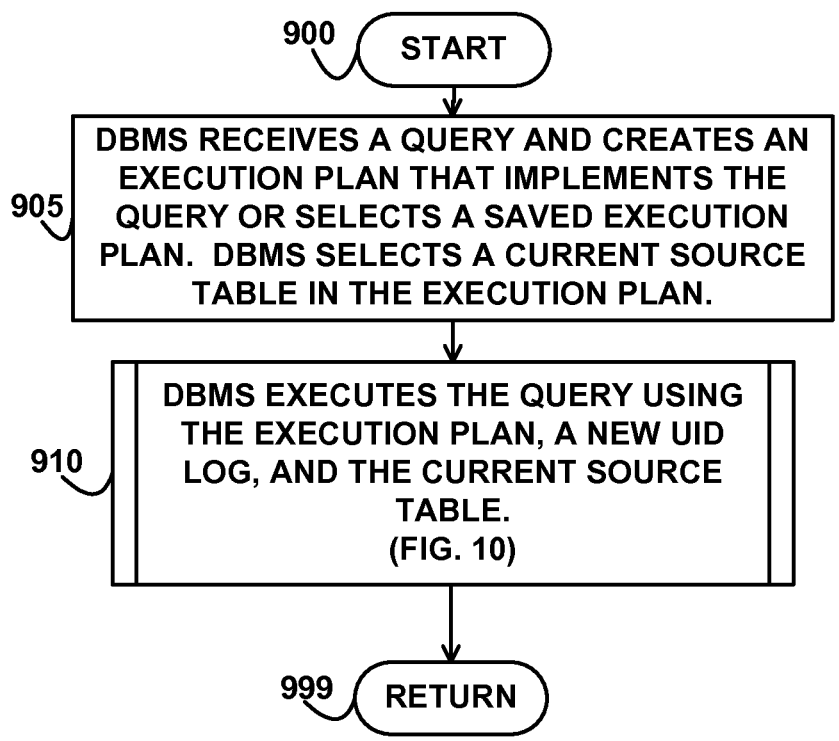
FIG. 9 depicts a flowchart of example processing for receiving a query, according to an embodiment of the invention.

FIG. 9 depicts a flowchart of example processing for receiving a query, according to an embodiment of the invention. Control begins at block 900. Control then continues to block 905 where the DBMS 150 receives a query from the application 160 and, in response, creates an execution plan 325 that implements the query or selects a saved execution plan. The DBMS 150 optimizes the execution plan 325 for the resources that are allocated to the virtual machine 140, in which the DBMS 150 executes. The DBMS 150 selects a current source table in the execution plan 325. Control then continues to block 910 where the DBMS 150 executes the query using the created or selected execution plan 325, a new UID log, and the current source table, as further described below with reference to FIG. 10. Control then continues to block 999 where the logic of FIG. 9 returns.

Figure 10:
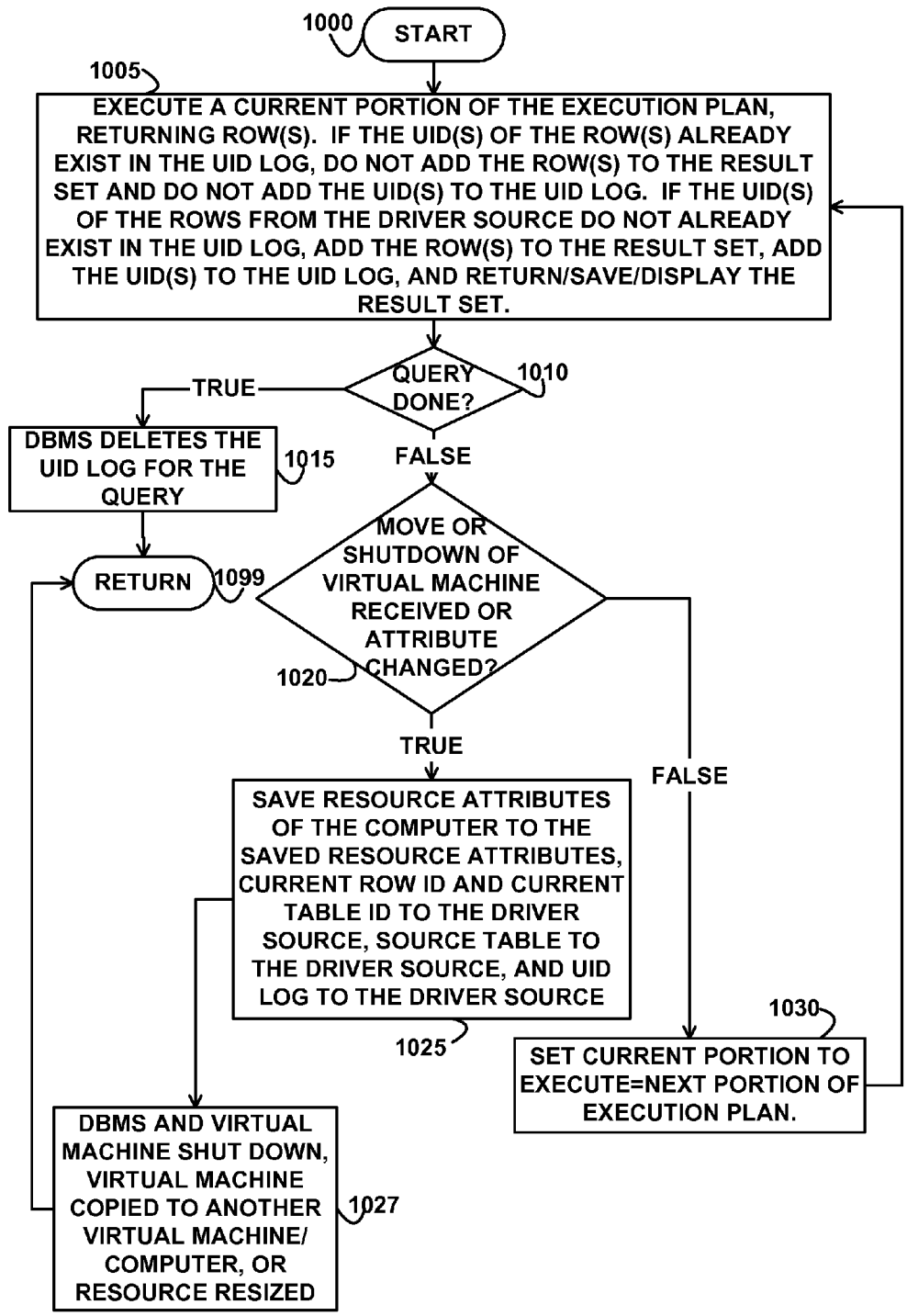
FIG. 10 depicts a flowchart of example processing for executing a query, according to an embodiment of the invention.

FIG. 10 depicts a flowchart of example processing for executing a query, according to an embodiment of the invention. Control begins at block 1000. Control then continues to block 1005 where the DBMS 150 executes a current portion of the execution plan 325, returning row(s). If the unique identifiers of the row(s) already exist in the UID log 562, the DBMS 150 does not add those row(s) to the result set 152 and does not add the unique identifiers to the UID log 562. If the unique identifiers of the rows do not already exist in the UID log 562, the DBMS 150 adds the rows that do not already exist to the result set 152, adds the unique identifiers of the driver source rows that do not already exist in the UID log 562 to the UID log 562, and returns the result set 152 to the user or application that requested the query 158, saves the result set 152, and/or displays the result set 152 via the user I/O device 121. If a partially-executed query exists in the memory allocated to the virtual machine in which the DBMS 150 executes, where the partially-executed query was partially executed by another virtual machine, the DBMS 150 starts executing the partially-executed execution plan at the next row in each table after the identifiers 505 identified by the driver source 380 of partially-executed execution plan.

Control then continues to block 1010 where the DBMS 150 determines whether the query is done. In an embodiment, the query is done if the DBMS 150 determines that the DBMS 150 has found all rows that satisfy the criteria of the query and has saved all the found rows that satisfy the criteria of the query to the result set 152. If the determination at block 1010 is true, then the query is done and all rows have been found and saved, so control continues to block 1015 where the DBMS 150 deletes the UID log 562 for the query. The DBMS 150 deletes the UID log 562 because, in an embodiment, the DBMS 150 in FIG. 8 detects that no partial results exists for a query by detecting the absence of the UID log 562. Control then continues to block 1099 where the logic of FIG. 10 returns.

If the determination at block 1010 is false, then the query is not done and not all rows that satisfy the query have been found by execution of the execution plan 325 and saved to the result set 152, so control continues to block 1020 where the DBMS 150 determines whether a shutdown command that requests shutdown or power off of the virtual machine 140 has been received by the virtual machine 140 in which the DBMS 150 executes or whether a move command that requests the move (copying) of the virtual machine 140 to another virtual machine 140 (at the same or a different computer) has been received, or whether a resize command that changes an attribute of a resource (e.g., an amount or speed of the resource) allocated to the virtual machine 140 has been received. In various embodiments, the virtual machine 140 receives the shutdown command, the move command, and/or the resize command from the application 160, from a user or administrator via the user I/O device 121, from a hypervisor, or from the client computer 132 via the network 130.

If the determination at block 1020 is true, then a shutdown, move, or resize command has been received by the virtual machine 140 in which the DBMS 150 executes, so control continues to block 1025 where the DBMS 150 saves the resource attributes of the computer on which the virtual machine 140 executes to the saved resource attributes 360 in the execution plan 325, saves the current row identifiers and the current table identifiers most recently read by execution of the execution plan 325 to the identifiers 505 in the driver source 380 in the execution plan 325, saves the source table identifier used by the execution plan 325 to the source table identifier 515 in the driver source 380 in the execution plan 325, and saves the UID log used by execution of the execution plan 325 to the UID log 562 in the driver source 380 in the execution plan 325. Control then continues to block 1027 where the DBMS 150 and the virtual machine 140, in which the DBMS 150 executes, shut down or stop executing, the virtual machine 140 is copied or moved and stored to the memory of another computer 100, and/or an attribute (e.g., an amount or speed) of the resources allocated to the virtual machine 140 change. In various embodiments, the copying, moving, or storing is performed by the virtual machine 140, by a hypervisor, by an operating system, or by any other appropriate program or product that executes on the processor of the computer 100. Control then continues to block 1099 where the logic of FIG. 10 returns.

If the determination at block 1020 is false, then a shutdown command that requests shutdown of the virtual machine 140 has not been received by the virtual machine 140 in which the DBMS 150 executes, an move command has not been received, and a resize command has not been received, so control continues to block 1030 where the DBMS 150 sets the current portion of the execution plan 325 to next execute to be the next unexecuted portion of the execution plan 325. Control then returns to block 1005 where the DBMS 150 executes the next current portion of the execution plan 325, as previously described above.

The logic represented by FIGS. 8, 9, and 10 may be reentrant and may be executed concurrently, substantially concurrently, or interleaved by multiple threads on the same or different processors on the same or different computers, creating and executing different execution plans via multi-threading, multi-tasking, multi-programming, or multi-processing techniques. In another embodiment, the different execution plans may be executed sequentially.

Thus, in an embodiment, a row is stored to a result set by executing an execution plan 325 if that row was not already added to the result set by partially executing any other execution plan, so an intersection of the rows added to the result set by the executing of all different execution plans for the same query is an empty set. In this way, in an embodiment, better performance is provided by continuing execution of a partially executed query using a second execution plan optimized for the resources that are allocated to a second virtual machine 140 instead of continuing to use a first execution plan that was partially executed and that was optimized for the different resources allocated to a first virtual machine 140.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, embodiments of the invention may be practiced without these specific details. In other instances, well-known circuits, structures, and techniques have not been shown in detail in order not to obscure embodiments of the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense.

What is claimed is:

1. A method comprising:
    executing, at a first virtual machine, a query implemented by a first execution plan;
    in response to a move command that requests a move of the first virtual machine from a first computer to a second computer while the first virtual machine is executing the query implemented by the first execution plan at the first computer, saving an attribute of a resource used by the executing at the first virtual machine to memory at the first computer and saving a driver source used by the executing at the first virtual machine to the memory at the first computer, wherein the driver source comprises a state of partial execution of the first execution plan; and
    in response to a command that requests starting a second virtual machine at the second computer, determining whether the driver source that comprises the state of the partial execution of the first execution plan exists in memory of the second computer, wherein the driver source comprises an identifier of a most recent row read from each table in a join order of a plurality of tables that implement the query, wherein the driver source comprises identifiers that uniquely identify rows from a source table that are in a result set and that satisfy the query, wherein the driver source comprises identifiers that uniquely identify rows from the source table that have been processed by the executing of the first virtual machine, but have not been added to the result set because those rows do not satisfy the query.

2. The method of claim 1, further comprising:
    if the driver source that comprises the state of the partial execution of the first execution plan exists in the memory at the second computer, determining whether the attribute of the resource used by the executing of the first virtual machine is within a threshold difference from an attribute of a resource allocated to the second virtual machine, wherein the move command requests a shutdown of the first virtual machine after the move of the first virtual machine from the first computer to the second computer.

3. The method of claim 2 further comprising:
    if the attribute of the resource used by the executing of the first virtual machine is within the threshold difference from the attribute of the resource allocated to the second virtual machine, continuing execution of the query at the second computer using the first execution plan starting from the state of the partial execution of the first execution plan.

4. The method of claim 3, further comprising:
    if the attribute of the resource used by the executing of the first virtual machine is not within the threshold difference from the attribute of the resource allocated to the second virtual machine, creating a second execution plan that is different from the first execution plan and continuing execution of the query at the second computer using the second execution plan.

5. The method of claim 1, wherein the source table comprises a first table in a join order of a plurality of tables that implement the query.

6. A non-transitory computer-readable storage medium encoded with instructions, wherein the instructions when executed comprise:
    executing, at a first virtual machine, a query implemented by a first execution plan;
    in response to a command that requests a shutdown of the first virtual machine while the first virtual machine is executing the query implemented by the first execution plan, saving an attribute of a resource used by the executing at the first virtual machine to memory allocated to the first virtual machine and saving a driver source used by the executing at the first virtual machine to the memory allocated to the first virtual machine, wherein the driver source comprises a state of partial execution of the first execution plan; and
    in response to a command that requests starting a second virtual machine, determining whether the driver source that comprises the state of the partial execution of the first execution plan exists in memory allocated to the second virtual machine, wherein the driver source comprises an identifier of a most recent row read from each table in a join order of a plurality of tables that implement the query, wherein the driver source comprises identifiers that uniquely identify rows from a source table that are in a result set and that satisfy the query, wherein the driver source comprises identifiers that uniquely identify rows from the source table that have been processed by the executing of the first virtual machine, but have not been added to the result set because those rows do not satisfy the query.

7. The non-transitory computer-readable storage medium of claim 6, further comprising:
if the attribute of the resource used by the executing of the first virtual machine is within the threshold difference from the attribute of the resource allocated to the second virtual machine, continuing execution of the query in the second virtual machine using the first execution plan starting from the state of the partial execution of the first execution plan, wherein the first virtual machine and the second virtual machine execute on different computers.

8. The non-transitory computer-readable storage medium of claim 7, further comprising:
if the attribute of the resource used by the executing of the first virtual machine is not within the threshold difference from the attribute of the resource allocated to the second virtual machine, creating a second execution plan that is different from the first execution plan and continuing execution of the query at the second virtual machine using the second execution plan.

9. The non-transitory computer-readable storage medium of claim 6, wherein the source table comprises a first table in a join order of a plurality of tables that implement the query.

10. The non-transitory computer-readable storage medium of claim 6, further comprising:
if the driver source that comprises the state of the partial execution of the first execution plan exists in the memory allocated to the second virtual machine, determining whether the attribute of the resource used by the executing of the first virtual machine is within a threshold difference from an attribute of a resource allocated to the second virtual machine.

11. A computer system comprising:
a processor; and
memory communicatively coupled to the processor, wherein the memory is encoded with instructions, wherein the instructions when executed by the processor comprise:
executing, at a first virtual machine, a query implemented by a first execution plan,
saving a first attribute of a resource used by the executing at the first virtual machine to the memory and saving a driver source used by the executing at the first virtual machine to the memory, wherein the driver source comprises a state of partial execution of the first execution plan, and
in response to a change in the first attribute of the resource to a second attribute, determining whether the first attribute of the resource used by the executing of the first virtual machine is within a threshold difference from the second attribute of the resource, wherein the driver source comprises an identifier of a most recent row read from each table in a join order of a plurality of tables that implement the query, wherein the driver source comprises identifiers that uniquely identify rows from a source table that are in a result set and that satisfy the query, wherein the driver source comprises identifiers that uniquely identify rows from the source table that have been processed by the executing of the first virtual machine, but have not been added to the result set because those rows do not satisfy the query.

12. The computer system of claim 11, wherein the instructions further comprise:
if the first attribute of the resource used by the executing of the first virtual machine is not within a threshold difference from the second attribute of the resource, creating a second execution plan that is different from the first execution plan and continuing execution of the query using the second execution plan.

13. The computer system of claim 11, wherein the change in the first attribute of the resource is caused by a move of the virtual machine between logical partitions in the computer system.

14. The computer system of claim 11, wherein the change in the first attribute of the resource is caused by a resize command that requests changes to an amount of the resource allocated to the virtual machine.

15. The computer system of claim 11, wherein the instructions executed by the processor further comprise:
if the first attribute of the resource used by the executing of the first virtual machine is within the threshold difference from the second attribute of the resource, continuing execution of the query using the first execution plan starting from the state of the partial execution of the first execution plan.

* * * * *